US008380083B2

(12) United States Patent
Yu

(10) Patent No.: US 8,380,083 B2
(45) Date of Patent: Feb. 19, 2013

(54) ALL OPTICAL UP-CONVERSION SYSTEM

(75) Inventor: Jianjun Yu, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 696 days.

(21) Appl. No.: 12/546,250

(22) Filed: Aug. 24, 2009

(65) Prior Publication Data

US 2010/0046962 A1 Feb. 25, 2010

Related U.S. Application Data

(60) Provisional application No. 61/091,495, filed on Aug. 25, 2008.

(51) Int. Cl.
*H04B 10/00* (2006.01)
(52) U.S. Cl. .......................... 398/176; 398/173
(58) Field of Classification Search .................. 398/173, 398/176
See application file for complete search history.

(56) References Cited

U.S. PATENT DOCUMENTS

| 2003/0077031 A1* | 4/2003 | Zhang et al. ..................... 385/24 |
| 2008/0131120 A1* | 6/2008 | Yu et al. ............................ 398/58 |
| 2008/0298813 A1* | 12/2008 | Song et al. ..................... 398/178 |

OTHER PUBLICATIONS

Jia et al.; A Full-Duplex Radio-Over-Fiber System Based on Optical Carrier Suppression and Reuse; IEEE Photonics Technology Letters, vol. 18, No. 16, Aug. 15, 2006, pp. 1726-1728 [online], [retrieved on Apr. 20, 2012]. Retrieved from the Internet <URL: http://ieeexplore.ieee.org/stamp/stamp.jsp?arnumber=01664932>.*
J. Yu et al., "Seamless Integration of an 8×2.5 Gb/s WDM-PON and Radio-Over-Fiber Using All-Optical Up-Conversion Based on Raman-Assisted FWM", IEEE Photonics Technology Letters, vol. 17, No. 9, Sep. 2005.
J. Ma et al., "Wavelength Conversion Based on Four-Wave Mixing in High-Nonlinear Dispersion Shifted Fiber Using a Dual-Pump Configuration", Journal of Lightwave Technology, vol. 24, No. 7, Jul. 2006.

* cited by examiner

*Primary Examiner* — Nathan Curs
(74) *Attorney, Agent, or Firm* — Joseph Kolodka

(57) ABSTRACT

An optical system for providing all-optical up-conversion of a baseband signal including an all-optical up-converter responsive to baseband signals to provide corresponding dual sideband signals about a suppressed optical carrier, said dual sideband signals each having the same polarization direction, being phase locked, having the same optical power and having a fixed frequency spacing; and an optical filter for filtering the carrier signals and providing wavelength division multiplexed signals without optical carriers. In a preferred embodiment, the all-optical up-converter includes an intensity modulator for generating two pump lightwaves that are carrier suppressed in response to the intensity modulator receiving a laser light source and being driven by an RF signal, wherein the intensity modulator is DC biased at a null point, an optical combiner for combining the baseband signal and the two pump lightwaves, a nonlinear medium for four wave mixing the baseband signal and two pump lightwaves to generate the baseband signal and corresponding dual sideband signals, and an optical interleaver for removing the baseband signal and two pump lightwaves to provide said sideband signals about the suppressed optical carrier.

6 Claims, 2 Drawing Sheets

ALL OPTICAL UP-CONVERSION SYSTEM

This application claims the benefit of U.S. Provisional Application No. 61/091,495, entitled "Polarization-Insensitive All-Optical Up-Conversion for Seamless Integration Optical Core/Metro/Access networks with ROF Systems based on a Dual PWM Scheme", filed on Aug. 25, 2008, the contents of which is incorporated by reference herein.

BACKGROUND OF THE INVENTION

The present invention relates generally to optical systems, and more particularly, to an all-optical up-conversion system.

The application of radio-over-fiber (ROF) systems for broadband wireless access networks has attracted much attention because it provides the high-bandwidth access services for mobile communications, wireless large-area networks, and fixed wireless access services such as local multipoint distribution systems. Fiber-optics technologies in millimeter-wave (mm-wave) wireless communication systems offer several advantages such as low-loss transmission of high-frequency signals and low electromagnetic interference. Since wavelength-division multiplexing (WDM) technology is widely used in optical transport networks from core to metro, WDM in access networks are the next logic step. In such networks, it is desirable to seamlessly integrate the WDM or WDM passive optical network (PON) transport systems with the ROF access system. An all-optical up-conversion of WDM signals for ROF provides an effective way to realize the hybrid networks.

Previous techniques to realize an all-optical up-conversion are polarization sensitive. These all-optical up-conversion methods are based on an external intensity or phase modulator and a cross-absorption modulation (XAM) in an electro-absorption modulator (EAM). These up-conversion techniques have some drawbacks like conversion loss and sensitivity to polarization of optical signals. Another all-optical up-conversion scheme is based on four-wave mixing (FWM) in the nonlinear optical fiber. With the advance of high-nonlinear dispersion-shifted fiber (HNL-DSF), highly efficient broadband FWM effect can be achieved. Because of the ultrafast nonlinear response of the fiber, it is possible to realize terahertz waveform all-optical mixing or up-conversion. Since FWM is independent of the signal bit rate and coding format, it can be used to realize up-conversion of multi-channel signals. However, the regular up-conversion scheme is polarization sensitive because only one single pump has been used.

Accordingly, there is a need for an all-optical up-conversion that is polarization insensitive and stable.

SUMMARY OF THE INVENTION

1. In accordance with the invention, there is provided an optical system for providing all-optical up-conversion of a baseband signal including an all-optical up-converter responsive to baseband signals to provide corresponding dual sideband signals about a suppressed optical carrier, said dual sideband signals each having the same polarization direction, being phase locked, having the same optical power and having a fixed frequency spacing; and an optical filter for filtering the carrier signals and providing wavelength division multiplexed signals without optical carriers. In a preferred embodiment, the all-optical up-converter includes an intensity modulator for generating two pump lightwaves that are carrier suppressed in response to the intensity modulator receiving a laser light source and being driven by an RF signal, wherein the intensity modulator is DC biased at a null point, an optical combiner for combining the baseband signal and the two pump lightwaves, a nonlinear medium for four wave mixing the baseband signal and two pump lightwaves to generate the baseband signal and corresponding dual sideband signals, and an optical interleaver for removing the baseband signal and two pump lightwaves to provide said sideband signals about the suppressed optical carrier.

BRIEF DESCRIPTION OF DRAWINGS

These and other advantages of the invention will be apparent to those of ordinary skill in the art by reference to the following detailed description and the accompanying drawings.

DETAILED DESCRIPTION

The invention is directed to a polarization insensitive and stable all-optical up-conversion in which co-polarized pump lightwaves generated by optical carrier suppression (OCS) modulation from one laser. A continuous wave CW lightwave 101 from a distributed feedback laser DFB-LD or other tunable external cavity lasers or other lasers is fed into an intensity modulator 102 driven by an RF signal 104 to generate two pump lightwaves without a carrier. The two lightwaves remaining after the carrier suppression will have the same polarization direction, phase locked and dame optical power and fixed frequency spacing. The DC bias on the intensity modulator is adjusted at a null point. In the case of an optical signal that includes original and baseband signals an optical combiner is used to combine the baseband signal and an OCS of the original signal. The optical combiner can be an optical coupler, WDM filter, arrayed waveguide grating AWG, or optical interleaver. The combined signals are passed through an optical amplifier, such as an erbium doped fiber amplifier EDFA semiconductor optical amplifier SOA. The amplified signal is routed through a nonlinear medium, such as a non-linear optical fiber, SOA or other nonlinear medium, which results in four-wave mixing of the amplified signal. An optical filter, such as a tunable optical filter, optical interleaver or AWG is used to remove the original signal and leave the up-converted sideband signals.

Figure 1:
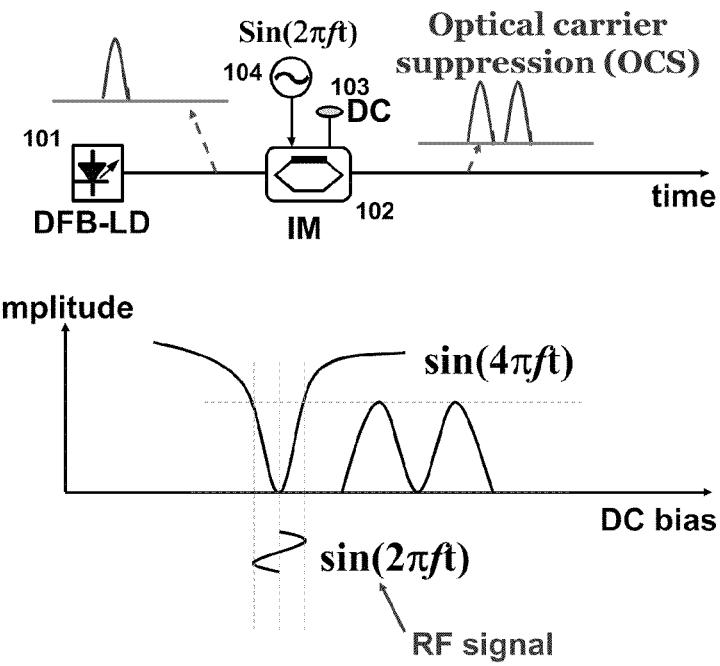
FIG. 1 is a diagram of an exemplary optical configuration, illustrating generation of two pump lightwaves employed in the invention.

Referring to FIG. 1, there is shown an exemplary optical configuration, illustrating the inventive optical carrier suppression (OCS). A distributed feedback laser diode DFB-LD is coupled to an intensity modulator IM 102 that is DC biased 103. The IM 102 modulates the light from the DFB-LD according to a signal 104 such that the optical carrier is suppressed leaving optical pulses representing the incoming signal 104 waveform with optical carrier suppression is shown in the associated graph, in FIG. 1. The OCS can be realized when the intensity modulator (IM) 102 is DC biased at a null point by a DC power source 103. If we assume that the modulator 102 is driven by a RF sinusoidal wave signal 104 with a repetitive frequency off After the intensity modulation IM, two subcarriers with wavelength spacing of 2f will be generated from the continuous wave CW lightwave 101 by a carrier suppression scheme. The generated two lightwaves (i.e., pumps) have the same polarization direction, optical power, and locked phase. The frequency spacing is exactly controlled by the RF frequency of the sinusoidal wave on the modulator.

Figure 2:
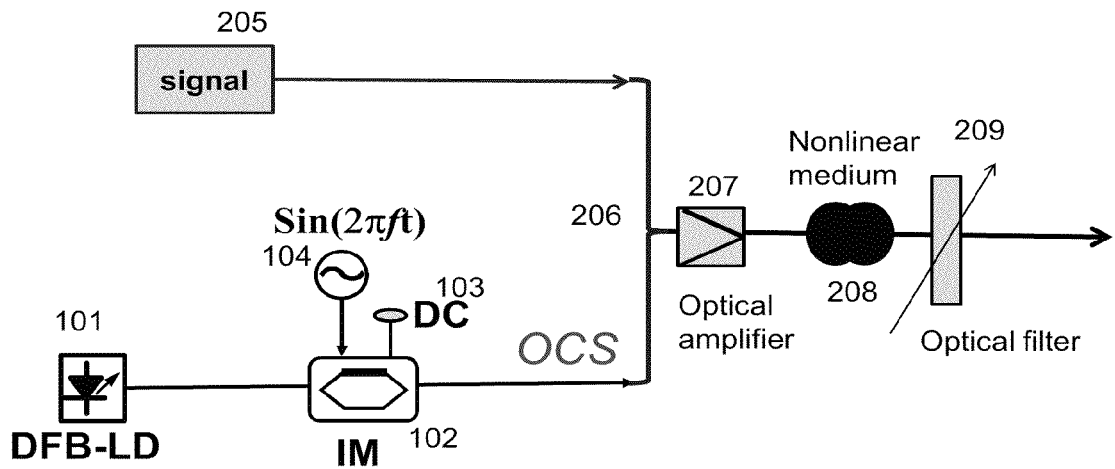
FIGS. 2A and 2B are diagrams illustrating an all-optical up-conversion in accordance with the invention.
Figure 2:
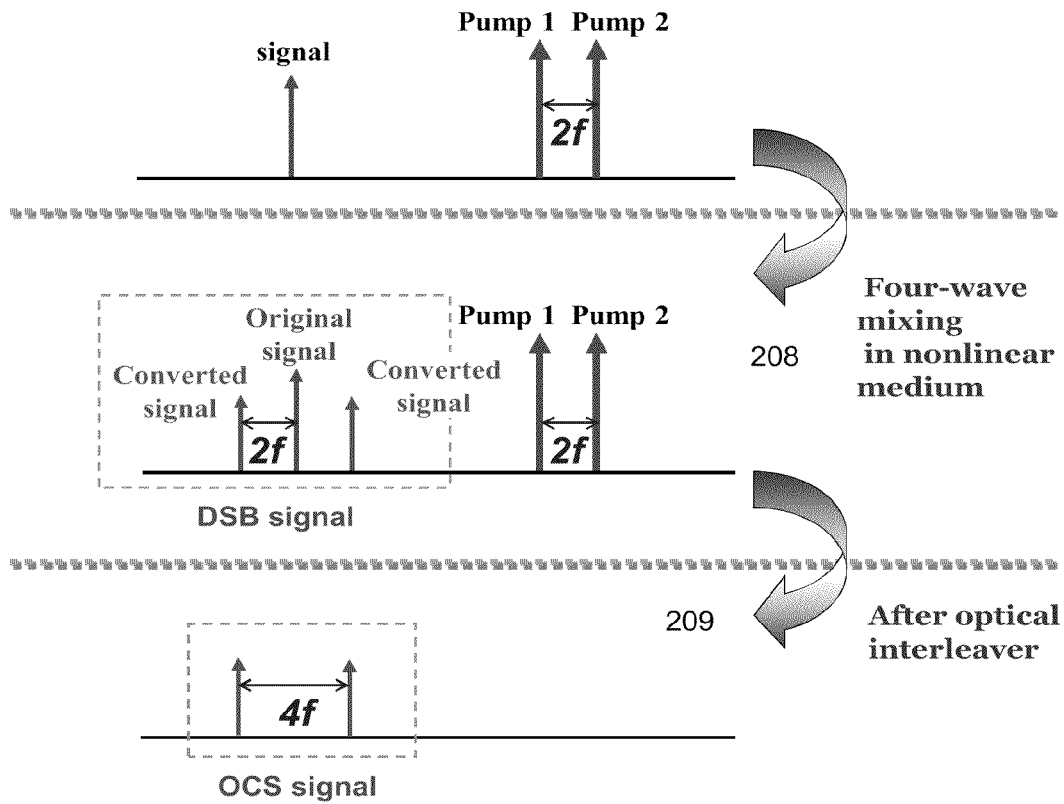

The optical configuration for realizing an all-optical up-conversion, in accordance with the invention, is shown in FIGS. 2A and 2B. To use the above OCS technique to generate two pump lightwaves, the two pump lightwaves always have the same polarization direction, phase lock and fixed frequency spacing. A signal (205) and two pumps of light out of the optical carrier suppression OCs portion of the circuit 101, 102, 103, 104 are combined by using an optical coupler (206) or wavelength division multiplexing devices (206). An optical amplifier such as an erbium doped fiber amplifier or semiconductor optical amplifier (207) is used to boost the signals before they are injected into the nonlinear medium (208) such as a nonlinear optical fiber, semiconductor optical amplifier or other nonlinear medium. After four-wave mixing in the nonlinear medium, we use an optical filter (209) to separate the upconverted signal from the pump lightwaves.

In the graph of FIG. 2B, which is associated with the optical configuration of FIG. 2A, we can see that the two converted new signals with channel spacing of 4f can be obtained after the Four-Wave Mixing (FWM) process in the nonlinear medium. The nonlinear medium can be nonlinear optical fiber, semiconductor optical amplifier or other nonlinear media. The two converted signals have the same polarization direction, and their phase is locked. In the inventive technique, the optical signals, similar to a double sideband (DSB), are generated which includes two converted signals and original signal after wavelength conversion. However, when the original signal is removed by the optical filter (209), the optical signals similar to optical carrier suppressed (OCS) up-converted signals carried by 4f optical carrier are achieved. For simplification, we will call these signals after up-conversion in the nonlinear medium as DSB or OCS signals.

Figure 3:
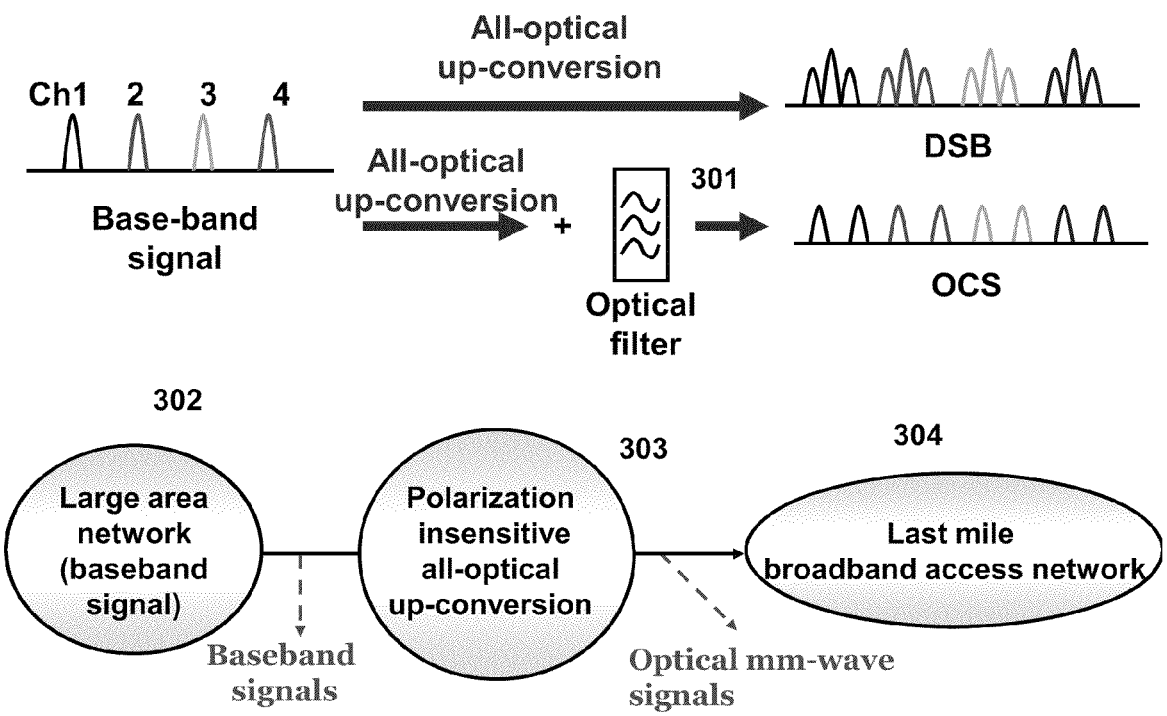
FIG. 3 is a diagram of all-optical up-conversion for WDM signals, in accordance with the invention.

Referring to FIG. 3, the inventive technique for all-optical up-conversion for Wavelength-Division Modulated WDM signals is diagrammed. Multiple channel baseband signals are all-optical upconverted 303 to produce double-sideband DSB signals. The DSB signals are filtered 301 to remove the originals signals and provide the OCS signals, which are the sidebands for each channel. The WDM signals coming from core or metro network 302 are delivered to the access network 304. If the baseband signals need to be up-converted to RF frequency to realize seamless integration with ROF systems, we can use our scheme to realize all-optical up-conversion. FIG. 3 shows the principle of simultaneously up-converting WDM baseband signals 302. Both DSB and OCS optical RF signal can be generated in the proposed scheme. For OCS optical signals, the optical interleaver (301) or other optical filter is added to suppress the optical carriers. Since OCS optical signals have higher receiver sensitivity without fading effect, it is a good candidate in future ROF network.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations, which although not explicitly shown or described herein, embody the principles of the invention and are within their spirit and scope.

What is claimed is:

1. An optical system for providing all-optical up-conversion of baseband signal comprising:
    an all-optical up-converter responsive to baseband signals to provide corresponding dual sideband signals about a suppressed optical carrier, said dual sideband signals each having the same polarization direction, being phase locked, having the same optical power and having a fixed frequency spacing; and
    an optical filter for filtering the carrier signals and providing wavelength division multiplexed signals without optical carriers;
    wherein the all-optical up-converter comprises:
        an intensity modulator for generating two pump lightwaves that correspond to a carrier suppressed in response to the intensity modulator receiving a laser light source and being driven by an RF signal;
        an optical combiner for combining the baseband signal and the two pump lightwaves; and
        a nonlinear medium for four wave mixing the baseband signal and two pump lightwaves to generate the baseband signal and corresponding dual sideband signals.

2. The optical system of claim 1, wherein the intensity modulator is DC biased at a null point.

3. The optical system of claim 1, wherein the all-optical converter comprises an optical interleaver for removing the baseband signal and two pump lightwaves to provide said sideband signals about the suppressed optical carrier.

4. The optical system of claim 1, wherein the optical filter comprises one of a tunable optical filter, an optical interleaver and an arrayed waveguide grating.

5. The optical system of claim 1, wherein the optical combiner comprises one of an optical coupler, wavelength division multiplexed filter, arrayed waveguide grating AWG, and optical interleaver.

6. The optical system of claim 1, wherein the nonlinear medium comprises one of a nonlinear optical fiber, a semiconductor amplifier and nonlinear optical medium.

* * * * *